United States Patent [19]

Endou

[11] Patent Number: 5,090,294
[45] Date of Patent: Feb. 25, 1992

[54] PNEUMATIC BOOSTER WITH TUBULAR PORTION FOR SEPARATELY DIRECTING AIR TO SILENCERS

[75] Inventor: Mitsuhiro Endou, Kanagawa, Japan

[73] Assignee: Tokico Ltd., Kanagawa, Japan

[21] Appl. No.: 608,485

[22] Filed: Nov. 1, 1990

[30] Foreign Application Priority Data

Nov. 2, 1989 [JP] Japan .............................. 1-128483[U]

[51] Int. Cl.$^5$ ................................................ F15B 9/10
[52] U.S. Cl. .................... 91/376 R; 91/369.2
[58] Field of Search ................ 91/369.2, 369.3, 369.4, 91/376 R

[56] References Cited

U.S. PATENT DOCUMENTS

| 4,022,112 | 5/1977 | Putt et al. | 91/369.2 X |
| 4,103,590 | 8/1978 | Putt | 91/376 R |
| 4,274,258 | 6/1981 | Shirai et al. | 91/369.2 X |
| 4,318,335 | 3/1982 | Wiegand et al. | 91/369.2 |
| 4,508,009 | 4/1985 | Shimamura et al. | 91/376 R |
| 4,546,691 | 10/1985 | Kobayashi et al. | 91/369.2 X |
| 4,587,884 | 5/1986 | Tsubouchi | 91/369.2 |
| 4,632,014 | 12/1986 | Endo | 91/369.2 |

FOREIGN PATENT DOCUMENTS 59-23654 7/1984 Japan .

Primary Examiner—Edward K. Look
Assistant Examiner—John Ryznic
Attorney, Agent, or Firm—Wenderoth, Lind & Ponack

[57] ABSTRACT

A pneumatic booster includes a casing, a valve body axially movably disposed in the casing and having a tubular portion extending backward to the outside of the casing and open at the rear end thereof, a set of a power piston and a diaphragm fixedly mounted on the valve body and partitioning the interior of the casing into a constant pressure chamber communicating with a negative pressure source and a variable pressure chamber adapted to selectively communicate with the negative source and the ambient air, a valve unit disposed in the tubular portion of the valve body for selectively placing the variable pressure chamber in communication with the negative pressure source and the ambient air, an input rod extending into the tubular portion of the valve body for actuating the valve unit, and an output rod connected to the valve body. The pneumatic booster further includes a plurality of silencers disposed in the tubular portion between the valve unit and the rear open end of the valve body and a partitioning member disposed in the tubular portion for defining a plurality of air passages for separately directing air to the respective silencers.

11 Claims, 4 Drawing Sheets

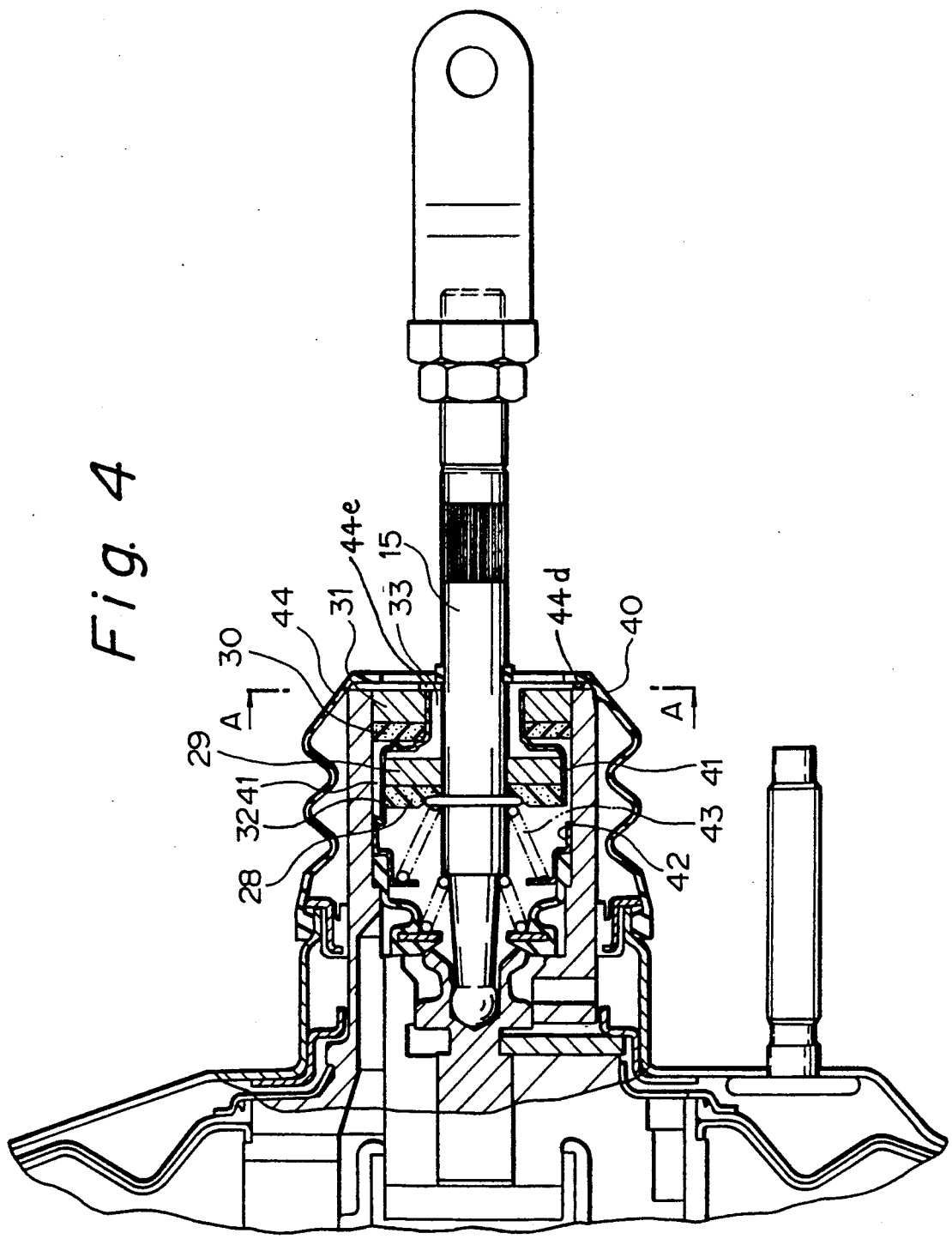

PNEUMATIC BOOSTER WITH TUBULAR PORTION FOR SEPARATELY DIRECTING AIR TO SILENCERS

BACKGROUND OF THE INVENTION

1. Field of the Invention

The present invention relates to a pneumatic booster for use in the brake system of a vehicle.

2. Prior Art

The brake system of a vehicle is commonly provided with a pneumatic booster for boosting a force applied to the brake pedal and for applying the boosted force to the master cylinder.

There is, for example, a known pneumatic booster which comprises a casing, a valve body, a combination of a power piston and a diaphragm mounted on the front portion of the valve body and partitioning the interior of the casing into two chambers, one of the two chambers being a constant pressure chamber communicating with a negative pressure source and the other being a variable pressure chamber selectively communicable with the negative pressure source and the ambient air, a valve unit disposed in a tubular potion of the valve body for selectively placing the variable pressure chamber in communication with the negative pressure source or the ambient air, an input rod connected to the brake pedal and inserted into the tubular portion of the valve body for actuating the valve unit, and an output rod connected to the power piston. When the ambient air is introduced into the variable pressure chamber, the difference in pressure between the constant pressure chamber and the variable pressure chamber functions to displace the power piston, so that the force applied to the input rod is boosted and the boosted force is output to the master cylinder through the output rod.

In the pneumatic booster of the type mentioned above, an air passage formed in the valve unit and a passage extending between the interior of the tubular portion of the valve body and the variable pressure chamber typically have small cross-sectional areas. When the ambient air is introduced into the variable pressure chamber by the valve unit, the air is therefore caused to flow extremely fast, thus generating a suction noise.

Various types of silencers have been proposed to eliminate disturbances which are caused by the suction noise being transmitted to the interior of the vehicle body.

FIG. 1 shows a conventional silencer unit in wide use. The silencer unit includes filters 52 and 53 and a silencer 54 interposed between the filters 52 and 53. The silencer unit is disposed in the interior of a tubular portion 50a of a valve body between a valve unit 51 and an open end of the tubular portion. Meshes of the filters 52 and 53 are so fine that they can eliminate dust from the air passing therethrough. The mesh of the silencer 54 is finer than those of the filters 52, 53 in order to decrease the noise generated by suction and to prevent the noise from being transmitted to the outside of the booster.

Japanese Utility Model Publication No. 59-23654 (1984) discloses a silencer unit designed to improve the silencing effect thereof.

The silencer unit is provided with an obstacle plate disposed in an air passage defined between a valve unit and an air inlet hole formed in a dust boot which covers the valve body, whereby the air passage is angulated at least once.

However, the conventional silencer units mentioned above do not satisfactorily silence the noise.

In the first mentioned conventional silencer unit, the silencer 54 may be thicker and/or closer in roughness of the meshes in order to improve the silencing effect. However, such a silencer inevitably involves increased resistance to the air to be introduced into the variable pressure chamber, thereby causing a delay in the operation of the booster.

Although the second mentioned conventional silencer unit has succeeded in improving the silencing effect by employing a combination of a filter and an angulated air passage, it is still not completely satisfactory. In order to further improve the silencing effect, the same method as in the first-mentioned filter unit may be employed, also involving the same problem of creating a delay in the operation of the booster. Further, the dust boot of this conventional booster has a complicated configuration, and a mold for fabricating the boot can be expensive. Further, the assembly of the filter and so on to the valve body is not easy. This results in the booster having high production costs.

SUMMARY OF THE INVENTION

In view of the foregoing, it is the main object of the present invention to provide a pneumatic booster including an improved silencer unit which can achieve an excellent silencing effect while securing a considerably wide area of air passage. The silencer unit is also a simple structure.

In order to achieve the above-described object, the present invention provides a pneumatic booster comprising a casing, a valve body axially movable forward and backward in the casing, the valve body having a tubular portion extending backward to the outside of the casing and open at the rear end thereof, a power piston and a diaphragm fixedly mounted at the inner circumference thereof to the valve body and partitioning the interior of the casing into a constant pressure chamber communicating with a negative pressure source and a variable pressure chamber adapted to selectively communicate with the negative source and the ambient air, a valve unit disposed in the tubular portion of the valve body for selectively placing the variable pressure chamber in communication with the negative source and the ambient air, an input rod inserted into the tubular portion of the valve body for actuating the valve unit, and an output rod connected to the valve body. The pneumatic booster further comprises a plurality of silencers disposed in the tubular portion between the valve unit and the rear opened and a partitioning element disposed in the tubular portion for defining a plurality of air passages for separately directing air to the respective silencers.

As a result of the above-described structure, the transmission of suction noise to the outside of the booster is prevented by means of the silencers associated with the respective air passages defined by the partitioning element while a considerably large cross-sectional area is used for the passage of air since a plurality of air passages are defined for separately directing air to the respective silencers. If desired, therefore, it is possible to employ silencers which are thicker and/or have a finer mesh so as to attain further improved silencing effects.

The above and further objects and novel features of the invention will become clearer from the following detailed description when taken in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is an elevational sectional view showing a third embodiment of the invention;

DETAILED DESCRIPTION OF THE PREFERRED EMBODIMENTS

Figure 2:
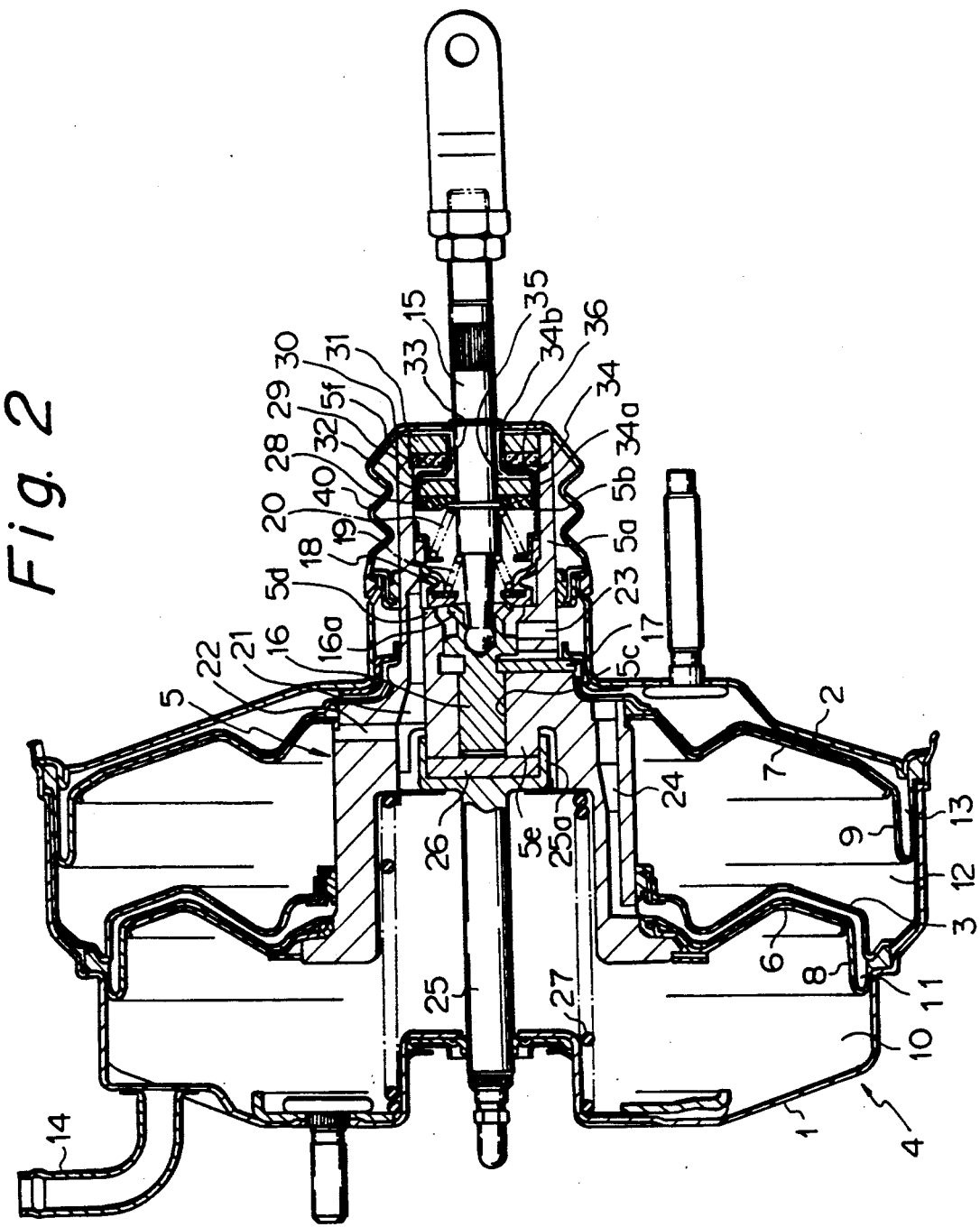
FIG. 2 is an elevational sectional view showing a first embodiment of the invention.
Figure 5:
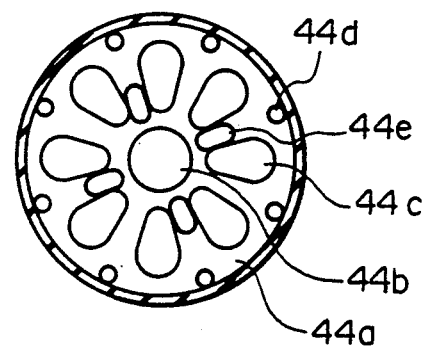
FIG. 5 is a sectional view taken along line 5—5 in FIG. 4.
Figures 6, 7:
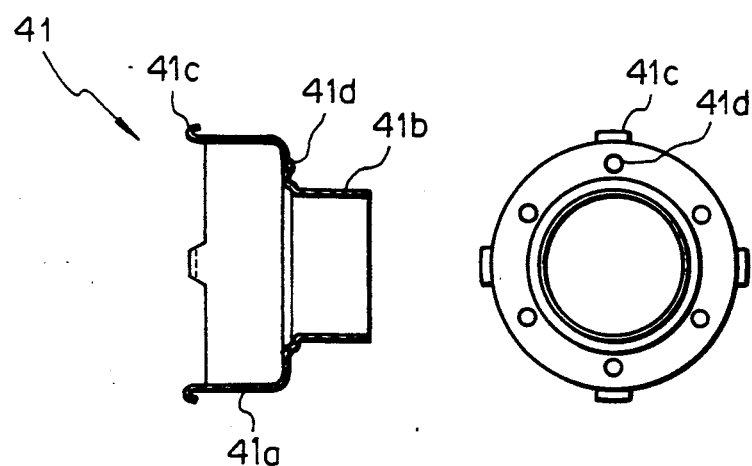
FIGS. 6 and 7 are sectional and front views, respectively, of the partitioning element employed in the embodiment shown in FIG. 4.

Referring to FIG. 2, a first embodiment of the present invention will be explained.

The first embodiment is a tandem type pneumatic booster. A front shell 1 and a rear shell 2 are connected to each other at their outer circumferences through a center plate 3 by caulking to form a body 4. The center plate 3 partitions the interior of the body 4 into front and rear chambers. A valve body 5 is disposed in the body 4 and extends through the center plate 3 and the rear shell 2. The valve body is axially movable. Two sets of power pistons 6 and 7 and diaphragms 8 and 9 are mounted on the front portion of the valve body 5 and positioned in the front and rear chambers, respectively. The inner circumferences of the power pistons 6 and 7 and the diaphragms 8 and 9 are fixedly secured to the valve body while the outer circumferences of the diaphragms 8 and 9 are fixedly secured to the body 4. The set of the power piston 6 and the diaphragm 8 partitions the interior of the front chamber into a front constant pressure chamber 10 and a front variable pressure chamber 11 while the other set of the power piston 7 and the diaphragm 9 partitions the interior of the rear chamber into a rear constant pressure chamber 12 and a rear variable pressure chamber 13. The front constant pressure chamber 10 communicates with a negative pressure source such as an intake manifold (not shown) through a negative pressure introduction tube 14 mounted on the front shell 1.

The valve body 5 is provided with a tubular rear portion 5a in which a large diameter bore 5b and a small diameter bore 5c are defined in the foregoing order from the rear of the tubular portion 5a. A plunger 16 is slidably disposed in the small diameter bore 5c and an input rod 15 is inserted through the large diameter bore 5b from the rear end of the body 5 and connected to the plunger 16 at the front end thereof. A key member 17 restricts the displacement of the plunger 16 with respect to the valve body in a predetermined range.

A valve seat 5d is formed on a shoulder portion between the large and small diameter bores while another valve seat 16a is formed on the rear end of the plunger 16. A poppet valve 18 is disposed in the large diameter bore 5b and is adapted to seat on and separate from the valve seats 5d and 16a, respectively. The valve seats 5d and 16a and the poppet valve 18 constitute a valve unit. Shown at 19 is a spring for biasing the poppet valve toward the valve seats 5d and 16a. Reference numeral 20 designates a spring for urging the input rod 15 backward.

A passage 21 is formed in the valve body 5. The passage 21 opens to the front constant pressure chamber 10 at one end thereof and to the large diameter bore 5b behind the valve seat 5d at the other end thereof. Another passage 22 branches from the passage 21 to communicate with the rear constant pressure chamber 12. The valve body 5 is further provided with a passage 23 open at one end thereof to the interior of the tubular portion 5a before the valve seat 5d and, at the other end thereof, to the rear variable pressure chamber 13, and a passage 24 open to the rear variable pressure chamber 12 at one end thereof and to the front variable pressure chamber 11 at the opposite end thereof.

A projecting portion 5e at the front of the valve body 5 has a recess portion 25a, formed on a rear end of an output rod 25, fixedly fitted thereto so that the output rod 25 is slidable together with the valve body 5. A reaction disc 26 is interposed between the projecting portion 5e of the valve body and the recess portion 25a of the output rod 25. A front end of the output rod 25 abuts against an input piston of a master cylinder (not shown). Shown at 27 is a return spring for forcing the valve body 5 backward. Reference numeral 40 designates a flexible dust cover.

In the large diameter bore are sequentially disposed a first filter 28, a first silencer 29, a second filter 30 and a second silencer 31 in the foregoing order behind the poppet valve 18. The filters 28 and 30 are made of sponge rubber or the like having meshes which are sufficiently fine to eliminate dust from the air passing therethrough. The silencers 29 and 31 are made of felt and press-formed with meshes which are finer than those of the filters 28 and 30. The four members mentioned above are all disc-shaped so as to have respective central openings.

Shown at 34 is a partitioning member having a large diameter tubular portion 34a and a small diameter tubular portion 34b. The large diameter tubular portion 34a fits on the outer circumferential surfaces of the first filter 28 and the first silencer 29 which are located adjacent to each other while the small diameter tubular portion 34b fits on the inner circumferential surfaces of the second filter 30 and the second silencer 31 which are located adjacent to each other. The first silencer 29 and the second filter 30 are spaced axially apart from each other. The second filter 30 and the second silencer 31 are snugly fitted on the inner circumferential surface of the tubular portion 5a of the valve body 5. The inner side surface of the second filter 30 abuts against a shoulder 5f formed in the tubular portion 5a. As shown in the figure, an annular gap 32 is defined between the inner circumferential surface of the tubular portion 5a and the outer circumferential surface of the large diameter tubular portion 34a while an annular gap 33 is defined between the inner circumferential surface of the small diameter tubular portion 34b and the outer surface of the input rod 15. Thus, the partitioning member 34 defines in the valve body 5 two air passage, a first air passage 35 which extends through the first filter 28 and the first silencer 29 and further through the annular gap 33 and a second air passage 36 which extends through the annular gap 32 and further through the second filter 30 and the second silencer 31.

The operation of the pneumatic booster having the above-described structure will next be explained.

When the booster is in unactuated position as shown in FIG. 2, the constant pressure chambers 10 and 12 and the variable pressure chamber are all under the same negative pressure, and the valve body 5 is urged backward together with the power pistons 6 and 7, respectively, by means of the spring 27.

When the brake pedal (not shown) is depressed to advance the input rod 15, the plunger 16 is displaced forward. As a result, the valve seat 16a of plunger 16 separates from the poppet valve 18, so that the ambient air is introduced into the rear variable chamber 13 through the first and second air passages 35 and 36, respectively, and further through the passage 23. The air is further introduced into the front variable pressure chamber 11 through the passage. Thus, a pressure difference is generated between the first constant pressure chamber 10 and the first variable pressure chamber 11 and between the second constant pressure chamber 12 and the second variable pressure chamber 13, thereby displacing forward the power pistons 6 and 7, respectively, and then the valve body 5. This advance movement acts to boost the input force input through the input rod 15 and to transmit the boosted force to the master cylinder through the output rod 25.

In operation, a suction noise which is generated when air passes through the clearance between the poppet valve 18 and the valve seat 16a and through the passage 23 is prevented from being transmitted to the outside of the booster, since the noise is substantially eliminated when passing through the first silencer 29 or second silencer 31. Air to be introduced into the valve body 5 passes through the two air passages 35 and 36, whereby the air flow substantially reaches a level which is twice that in the case of the conventional booster. It is possible, therefore, to employ silencers having a thicker width and/or finer meshes, if desired, without causing any delay in the operation of the booster.

In the first embodiment, the first and second filters 28 and 30 are respectively positioned on the sides of the first and second silencers 29 and 31 closer to the poppet valve 18. This arrangement is advantageous in that fibers constituting the silencers 29 and 31 are prevented from entering the variable pressure chambers 11 and 13, respectively.

Figure 1:
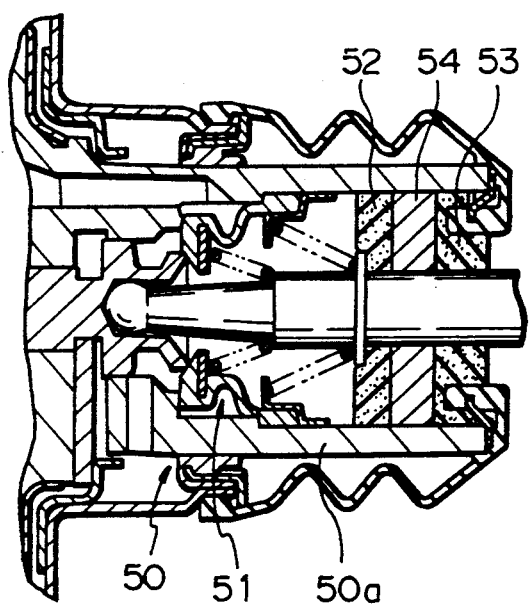
FIG. 1 is an elevational sectional view showing the main portion of one example of conventional pneumatic boosters.
Figure 3:
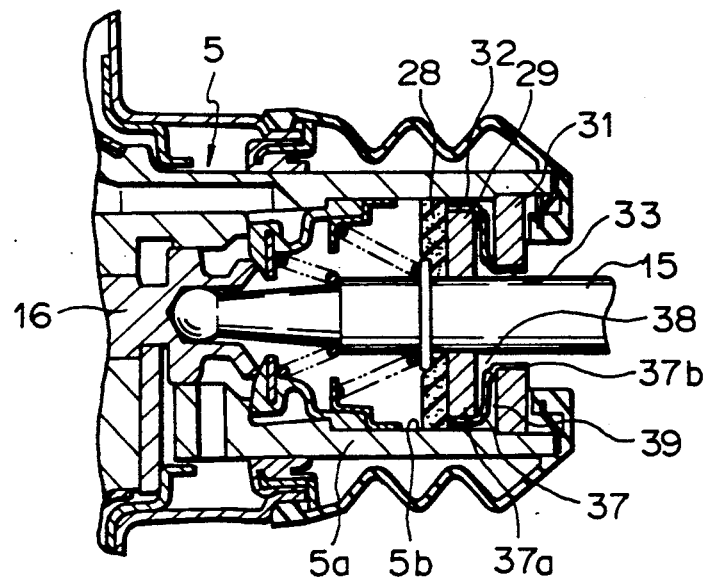
FIG. 3 is an elevational sectional view showing the main portion of a second embodiment of the invention.

Referring now to FIG. 3, a second embodiment of the present invention will be explained. The same reference numbers will be used to designates the same element as those of the first embodiment and a detailed explanation thereof will be omitted.

In a tubular portion 5a of a valve body are sequentially disposed a filter 28, a first silencer 29 and a second silencer 31 in the foregoing order behind a poppet valve 18. The filter 28 and the first and second silencers 29, 31 are all disc-shaped and have respective central openings.

Shown at 37 is a partitioning member provided with a large diameter tubular portion 37a and a small diameter tubular portion 37b. The large diameter tubular portion 37a fits on the outer circumferential surface of the first silencer 29 while the small diameter tubular portion 37b fits on the inner circumferential surface of the second silencer 31. The first and second silencers 29 and 31 are spaced axially apart from each other and the filter 28 is located adjacent to the first silencer 29. The filter 28 and the second silencer 31 are closely fitted around the inner circumferential surface of the tubular portion 5a of the valve body. As shown in the figure, annular gaps 32 and 33 are respectively defined between the inner circumferential surface of the tubular portion 5a and the outer surface of the large diameter tubular portion 37a and between the inner surface of the small diameter tubular portion 37b and the outer surface of an input rod 15. Thus, the partitioning member 37 defines in the tubular portion 5a a first air passage 38 passing through the gap 33, silencer 29 and filter 28 and a second passage 39 passing through the second silencer 31, gap 32 and filter 28.

The operation of the second embodiment is the same as in the case of the first embodiment. Since the second embodiment uses only one filter, production costs will be lower as compared with the first embodiment.

Referring now to FIGS. 4 to 7, a third embodiment of the present invention will be explained. The same reference numerals are used to designate the same elements of the first embodiment and explanation thereof will be omitted.

Shown at 41 is a partitioning member having a large diameter tubular portion 41a and a small diameter tubular portion 41b. The large diameter tubular portion 41a defines an annular gap 32 together with a tubular portion 5a of a valve body 5, while the small diameter tubular portion 41b defines an annular gap 33 together with an input rod 15. The partitioning member is further provided with four claws 41c formed on the front end thereof and spaced circumferentially equally apart from each other. The claws 41c firmly engage the inner surface of tubular portion 5a within the large diameter bore of the valve body 5 to secure the partitioning member 41 in place. The claws 41c may be designed to engage a spring seat member 42 disposed in the large diameter bore 5b for receiving one end of a spring 43 for the input rod 15. A plurality of projections 41d are formed on a shoulder portion defined between the large diameter tubular portion 41a and the small diameter tubular portion 41b. The projections 41d abut against the second filter 30 to position the second filter 30 and the second silencer 31 in place in the large diameter bore 5b. As opposed to the first and second embodiments, therefore, the valve body 5 of this embodiment is not provided with a shoulder portion 5f against which the inner side surface of the second filter 30 is to abut at the outer circumference thereof. Reference numeral 44 designates a dust cover having a flat portion 44a covering the rear end opening of the valve body 5. A central bore 44b is formed through the flat portion 44a for receiving the input rod 15. A plurality of air holes 44c are also formed through the flat portion 44a. On the inner surface of the flat portion 44a are formed a plurality of projections 44d and a plurality of projections 44e which are located radially inwardly of the first-mentioned projections 44d. The first-mentioned projections 44d abut against the rear end of the tubular portion 5a while the second mentioned projections 44e abut against the rear end of the partitioning member 41, so that a space is defined between the second silencer 31 and the flat portion 44a of the dust cover 44.

In the above-mentioned embodiments, the silencers 29 and 31 and the partitioning member 34 (37, 41) are arranged such that the first silencer 29 is closer to the poppet valve 18 than the second silencer. In an alternative embodiment, however, those elements may be arranged such that the second silencer 31 is closer to the poppet valve 18 than the first silencer.

As clearly understood from the foregoing, the present invention provides a pneumatic booster in which a silencing effect is considerably improved without causing any delay in the operation of the booster.

The present invention only employs a partitioning member in addition to a silencer unit which has been conventionally used. It therefore maintains production costs of the booster to a minimum. The application of the present invention to conventional pneumatic boosters only involves a minor design modification.

What is claimed is:

1. A pneumatic booster comprising:
    a casing;
    a valve body (forward and backward) movably disposed in said casing so as to be axially displaceable in forward and backward directions, said valve body having a tubular portion extending backward to the outside of said casing and open at the rear end thereof;
    a set of a power piston and a diaphragm fixedly mounted at the inner circumference thereof to said valve body and partitioning the interior of said casing into a constant pressure chamber communicable with a negative pressure source and a variable pressure chamber adapted to selectively communicate with the negative pressure source and the ambient air;
    a valve unit disposed in said tubular portion of the valve body for selectively placing said variable pressure chamber in communication with the negative pressure source and the ambient air;
    an input rod extending into said tubular portion of the valve body for actuating said valve unit;
    an output rod connected to said valve body;
    a partitioning member disposed in said tubular portion of the valve body between said valve unit and the rear open end of said tubular portion, said partitioning member defining first and second air passages extending along the tubular portion; and
    first and second silencers disposed in said first and second air passages, respectively,
    said partitioning member being a tubular member having a large tubular portion, and a small tubular portion of a diameter smaller than that of said large tubular portion, said first air passage including a space between the inner circumferential surface of said small tubular portion and the outer surface of said input rod, said second air passage including a space defined between the outer circumferential surface of said large tubular portion and the inner surface of the tubular portion of said valve body, said first silencer being disposed between the inner surface of said large diameter portion and the outer surface of said input rod, and said second silencer being disposed between the outer surface of said small tubular portion and the inner surface of the tubular portion of said valve body.

2. A pneumatic booster according to claim 1, and further comprising first and second filters respectively located on the side of the respective silencers closer to said valve unit.

3. A pneumatic booster according to claim 1, and further comprising a single filter located on the inner end of said partitioning member so that air from both of said first and said second air passage passes through said filter.

4. A pneumatic booster according to claim 1, wherein the small diameter portion of said partitioning member is located adjacent to the rear open end of the tubular portion of said valve body.

5. A pneumatic booster according to claim 4, wherein said tubular portion of the valve body has a shoulder therein adjacent to the rear open end thereof, said shoulder abutting against and positioning said second silencer.

6. A pneumatic booster according to claim 4, wherein said tubular portion has a shoulder therein adjacent to the rear open end thereof, and further comprising a filter interposed between and abutting against said shoulder and said second silencer whereby said shoulder positions said second silencer in place.

7. A pneumatic booster according to claim 4, and further comprising a dust cover having a flat portion covering said rear open end, said flat portion defining a central opening extending therethrough and receiving said input rod, and a plurality of air holes extending therethrough, said flat portion including a first and a second set of projections on the inner surface thereof, said first and second sets of projections respectively abutting against the rear end of the tubular portion of said valve body and against the rear end of the small tubular portion of said partitioning member, thereby defining a space between said second silencer and the flat portion of the dust cover.

8. A pneumatic booster according to claim 1, wherein said partitioning member further includes a plurality of claws formed on a free end of the large tubular portion thereof and circumferentially spaced apart from each other, said claws engaging the inner surface of the tubular portion of said valve body to secure the partitioning member in place.

9. A pneumatic booster according to claim 8, wherein the small diameter portion of said partitioning member is located adjacent to the rear open end of said valve body.

10. A pneumatic booster according to claim 9, wherein a plurality of projections extend from a shoulder of said partitioning member, defined between said large and said small tubular portions thereof, in a direction toward said small tubular portion, said projections positioning said second silencer in place.

11. A pneumatic booster according to claim 10, and further comprising a filter interposed between said projections and said second silencer, said projections abutting against said filter.

* * * * *